Dec. 23, 1941.  J. O. ZIMMER  2,267,008
DRILL AND SCREW HOLDER
Filed Aug. 15, 1941
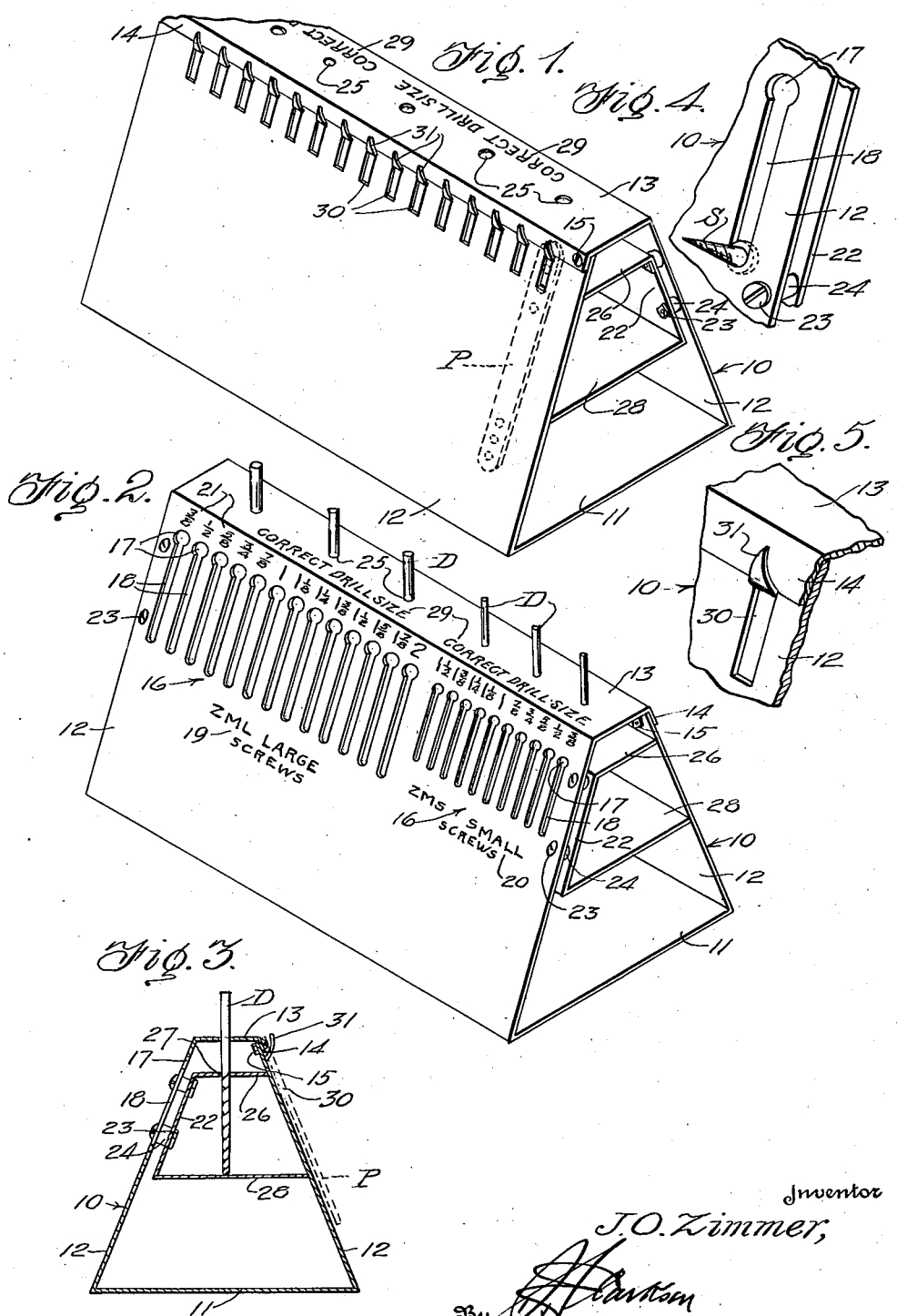
Inventor
J. O. Zimmer,
By
Attorney

Patented Dec. 23, 1941

2,267,008

UNITED STATES PATENT OFFICE 2,267,008

DRILL AND SCREW HOLDER

Justin O. Zimmer, Warsaw, Ind., assignor to Zimmer Manufacturing Company, Warsaw, Ind.

Application August 15, 1941, Serial No. 407,088

6 Claims. (Cl. 211—69)

This invention relates to holders for drills and screws and has special reference to a holder for the drills and screws used by orthopedic surgeons in bone plating.

In the operation of bone plating the surgeon makes a longitudinal cut at the seat of fracture so as to expose the bone several inches above and below the break. With the use of certain instruments, the broken fragments are lined up and placed in proper apposition. A stainless steel plate of the desired length is then placed lengthwise on the bone and over the seat of fracture. The plate is held firmly by a special bone clamp. The next step is to use a twist drill and bore holes in the bone as designated by the holes in the plate. In order that the operation may be performed in the most perfect manner, a twist drill should be used so as to bore a hole with the correct diameter, namely the diameter of the root of the screw. If a hole is drilled with a diameter larger than the root of screw to be used, there is a certain percent of loss in the holding power of the screw threads, while there is always danger of splitting the bone if the diameter of the hole is less than the diameter of the root of the screw. Therefore, one can readily understand the importance of stamping "correct drill size" in the metal.

In such an operation the screws used are commonly confined to two diameters but for each diameter a number of different lengths must be available. Since, in all such operations it is desirable that the time required to complete the operation should be reduced to a minimum it is essential that, after the surgeon studies the X-ray pictures taken in such cases and determines the length and size of screw to be used, the proper sized drill must be at once available together with all screws of the selected size and length.

One important object of the present invention is to provide a novel drill and screw holder for bone plating operations wherein provision is made for grouping all screws of a given diameter with drills for such screws.

A second important object of the invention is to provide, in such a holder, means for grouping all screws of a given size and length so that no confusion may take place as to the diameter and length of the screws being used.

A third important object of the invention is to provide screw holding means for sets of screws wherein the removal of a screw of a given diameter and length causes the remaining screws of the same size and length to form an index to indicate the use of such remaining screws in the operation.

In a bone plating operation it is necessary that all plates, screws and drills be sterilized.

It is a very important object of the present invention to provide a novel plate, drill and screw holder whereby all the above necessary devices may be simultaneously subjected to a sterilizing treatment, for instance in an autoclave, while being retained in proper order in the holder so that, after sterilization, the holder and its equipment may be removed bodily and placed at once where desired by the operating surgeon.

A fifth important object of the invention is to provide suitable indicia associated with the means for holding drills and screws in such a holder.

With the above and other objects in view as will be hereinafter apparent, the invention consists in general of certain novel details of construction and combinations of parts hereinafter fully described, illustrated in the accompanying drawing and specifically claimed.

In the accompanying drawing like characters of reference indicate like parts in the several views, and:

Figure 1 is a perspective view from one corner of the device showing the means for supporting bone plates, the view being partly broken.

Figure 2 is a perspective view from the diagonally opposite corner of the device showing certain screw holding slots forming part of this invention.

Figure 3 is a transverse section through the holder.

Figure 4 is an enlarged fragmentary perspective showing one of the screw holding slots.

Figure 5 is an enlarged fragmentary perspective showing one of the bone plate hangers.

In the form of the device here disclosed there is shown in the drawing a holder having a body 10 formed of a single sheet of non-corrosive metal or alloy such as stainless steel. This sheet is bent to prismatic form having a base 11, sides 12 extending upwardly from the side edges of the base and inclined toward each other, and a top 13 extending from the upper edge of one side and over the upper edge of the other side. A lip 14 is provided on the free side edge of the top and extends down on the outer face of the adjacent side 12. The lip is fastened to its cooperating side by suitable means such as are indicated by the bolts 15.

In the side wall 12 remote from the lip there is provided a plurality of groups 16 of key hole slots each having a segmento-circular head opening 17 adjacent the upper edge of the side 12 and a relatively narrow slot 18 extending downwardly therefrom. It is to be noted that, in each group 16 the openings 17 are of the same diameter and the slots 18 are of the same width and length. While but two groups 16 are shown, however, it is obvious that as many groups as may be desired may be used. Below one of these groups is stamped or otherwise shown indicia 19 indicating the diameter and relatively large size of the screws to be held in the slots of that group while indicia 20 indicate similarly the screws held in the other group. Above the several openings 17 are indicia 21 indicating the lengths of the screws held in the associated slots. In each group the openings 17 are of proper size to admit the heads of the screws to be held in that group and the length of each slot 18 is such that eight or more screws of the same size may be held in that slot.

Behind the slots is a stop plate 22 which is secured to the side 12 by bolts 23 and spaced inwardly of that side by spacers 24 of such size that the heads of the screws held in the slots may be received between the plate 22 and side 12, while the plate 22 is close enough to the side to prevent the screws from dropping into the interior of the holder.

In the top wall 13 opposite each group 16 of slots is a plurality of drill receiving openings 25 of such size as to snugly receive the drills proper to the screws held in that group 16 of slots with which the openings 25 are associated. Extending horizontally from the upper edge of the plate 22 is a partition plate 26 having openings vertically aligned below the openings 25 and of similar size, one such opening being shown in Figure 3 at 27. Extending horizontally from the lower edge of the plate 22 is a plate 28 which constitutes a stop for drills D held in the openings 25 and 27. Indicia 29 are associated with the groups 16 and the sets of drill openings so that the surgeon may know that the drills are of correct size to use with associated screws S.

Slots 30 are formed in the side 12 over which the lip 14 engages, these slots being spaced along the side just below said lip. Each slot 30 has the material struck therefrom left attached to the upper end of the slot to form an end curving outwardly and upwardly from the slot to provide a hook 31 for supporting one of the bone plates P used in the aforementioned operation. These plates come in different sizes requiring different numbers of screws for securing them to the broken bone and by means of this holder are displayed where the surgeon may be enabled to select the plate best suited to the particular operation being performed.

It will now be plain that when the holder is fully equipped it will carry all plates, screws and drills necessary for any bone plating operation and that the entire assemblage may be sterilized as a unit and removed as a unit from the sterilizer after completion of sterilization.

What is claimed is:

1. A screw and drill holder including a body of sheet metal in prismatic tubular form and having a horizontally disposed base, sides extending upwardly from the lateral edges of the base and inclined toward each other and a top spanning the space between the upper edges of the sides, one of said sides having a plurality of groups of vertical key-hole slots each having a relatively large upper end and a relatively narrow lower end, and a stop plate secured to the body in spaced relation to the slotted side.

2. A screw and drill holder including a body of sheet metal in prismatic tubular form and having a horizontally disposed base, sides extending upwardly from the lateral edges of the base and inclined toward each other and a top spanning the space between the upper edges of the sides, one of said sides having a plurality of groups of vertical key-hole slots each having a relatively large upper end and a relatively narrow lower end, and a stop plate secured to the body in spaced relation to the slotted side, the upper ends of the slots in each group being of equal diameter and the lower ends of the slots of each group being of equal width.

3. A screw and drill holder including a body of sheet metal in prismatic tubular form and having a horizontally disposed base, sides extending upwardly from the lateral edges of the base and inclined toward each other and a top spanning the space between the upper edges of the sides, one of said sides having a plurality of groups of vertical key-hole slots each having a relatively large upper end and a relatively narrow lower end, and a stop plate secured to the body in spaced relation to the slotted side, the upper ends of the slots in each group being of equal diameter and the lower ends of the slots of each group being of equal width, said top having sets of drill receiving openings, each set being arranged opposite a corresponding group of the slots and adapted to receive drills of a diameter to drill holes for the screws fitting in the slots of the associated group.

4. A screw and drill holder including a body of sheet metal in prismatic tubular form and having a horizontally disposed base, sides extending upwardly from the lateral edges of the base and inclined toward each other and a top spanning the space between the upper edges of the sides, one of said sides having a plurality of groups of key-hole slots each having a relatively large upper end and a relatively narrow lower end, a stop plate secured to the body in spaced relation to the slotted side, and a plurality of vertically spaced partitions extending across the body parallel to the top, said top and the upper partition having sets of vertically aligned drill receiving openings, each set being arranged opposite a corresponding group of the slots and being of a diameter to fit drills of proper size to drill holes for the screws of the associated group.

5. A screw and drill holder including a body of sheet metal in prismatic tubular form and having a horizontally disposed base, sides extending upwardly from the lateral edges of the base and inclined toward each other and a top spanning the space between the upper edges of the sides, one of said sides having a plurality of groups of key-hole slots each having a relatively large upper end and a relatively narrow lower end, a stop plate secured to the body in spaced relation to the slotted side, the upper ends of the slots in each group being of equal diameter and the lower ends of the slots of each group being of equal width, and a plurality of vertically spaced partitions extending across the body parallel to the top, said top and the upper partition having sets of vertically aligned drill receiving openings, each set being arranged opposite a corresponding group of the slots and being of a diameter to fit drills of proper size to drill holes for the screws of the associated group.

6. A screw and drill holder including a body of sheet metal in prismatic tubular form and having a horizontally disposed base, sides extending upwardly from the lateral edges of the base and inclined toward each other and a top spanning the space between the upper edges of the sides, one of said sides having a plurality of groups of key-hole slots each having a relatively large upper end and a relatively narrow lower end, a stop plate secured to the body in spaced relation to the slotted side, the upper ends of the slots in each group being of equal diameter and the lower ends of the slots of each group being of equal width, said body having screw length indicia associated with the respective slots, and a plurality of vertically spaced partitions extending across the body parallel to the top, said top and the upper partition having sets of vertically aligned drill receiving openings, each set being arranged opposite a corresponding group of the slots and being of a diameter to fit drills of proper size to drill holes for the screws of the associated group.

JUSTIN O. ZIMMER.